June 8, 1926.

H. CAMINEZ

HYDRAULIC CLUTCH

Filed Dec. 9, 1920

INVENTOR.
Harold Caminez,
By F. K. Fassett,
ATTORNEY

Patented June 8, 1926.

1,588,166

UNITED STATES PATENT OFFICE.

HAROLD CAMINEZ, OF DAYTON, OHIO.

HYDRAULIC CLUTCH.

Application filed December 9, 1920. Serial No. 429,342.

My present invention relates to hydraulic clutches such as are used for driving machinery, especially wherein it is desirable to start and stop the driven mechanism at will and drive it at variable speed.

While such clutches are applicable to a large variety of uses there is no field, probably, more extensive than that of automobiles. If, therefore, the present clutch is described largely in terms of the automotive industry, it is not to be inferred that my invention is limited in its application to that field. The following are some of the principal requirements of a clutch;

1. It should be capable of holding the full torque of the driving element without appreciable slip.

2. There should be no drag between driving and driven members of the clutch when they are disengaged.

3. The clutch should be capable of slipping; that is, it should be able to transmit torque and still allow relative motion between the driving and driven members.

(a) The amount of this slipping should be controllable.

(b) Slipping should not cause excessive wear of the clutch members.

(c) The heat evolved during slipping should be readily dissipated.

4. The moment of inertia of the driven member should be small.

5. The force necessary to operate the clutch; i. e., to engage and disengage it, should be comparatively slight.

6. The clutch should be light, compact and rugged. It should be simple in operation and design and lend itself readily to standard manufacturing practice.

The reason why a clutch should hold the full torque without appreciable slip is obvious. That it should not exert any drag upon the driven member when disengaged is almost equally obvious. Any drag on the driven member when the clutch is disengaged consumes energy; furthermore, it is objectionable at the time of disengaging the clutch because of the tendency of the driven member to continue rotating. This is especially true in automobile clutches and closely related to this point is the moment of inertia of the driven member. In automobile clutches the shifting of the gears is much facilitated by providing a driven member with a small moment of inertia and eliminating all drag when the clutch is disengaged. It is customary to provide a spring for engaging the clutch of an automobile. As the clutch must be operated by a foot pedal in opposition to this spring it very desirable to have a clutch which may be engaged with a comparatively light spring. There is no single point, perhaps, in connection with an automobile clutch more important than the capacity for slipping. It is very desirable that a clutch be capable of slipping, so as to drive the car at various speeds, smoothly and uniformly, without injury to the clutch mechanism. This is becoming more and more necessary as the congestion of traffic in city streets increases, making it necessary, frequently to drive very slowly for considerable distances.

The object of the present invention is to provide a hydraulic clutch possessing the desirable characteristics mentioned and in the accompanying drawings I have illustrated two embodiments of the invention.

Although at the present time I do not regard the type of clutch illustrated in Figs. 1 and 2 as the preferred form, I will describe it first, because the principle on which my clutch operates is more easily explained in connection with this type than with the spherical type shown in Figs. 7 and 9.

Referring now to Figs. 1 to 5, the driven member of the clutch comprises a circular plate or base 25, from the center of which extends a long boss or what will hereinafter be referred to as a shaft, 26. Extending from the side of the base opposite the shaft, but concentric to its axis, is an annular collar 27. Surrounding this collar is the cylindrical wall 30 of a cup shaped member which will hereinafter be referred to as the driving member, having a bottom 31. The rim of the wall 30 bears on the base plate 25 and is adapted to form a liquid retaining contact therewith. A cylindrical boss 32 in the center of the cup, joined to the bottom 31, also extends to the base 25 and forms a liquid retaining contact therewith. The diameter of this boss is such that if the driving member be shifted laterally with reference to the collar 27, so that the interior of the wall 30 bears against the collar, the boss 32 will bear with equal pressure against the inner surface of the collar. The annular space 33 between the wall 30 and boss 32 will hereinafter be referred to as a chamber, and in certain of the claims the driving member itself will be referred to as the chambered member. When this chambered member is shifted to a central position with reference to the driven member, so that the axis of the boss 32 coincides with the axis of the shaft 26, the chamber of the driving member is divided by the collar 27 into two symmetrical annular compartments. These compartments are made unsymmetrical by lateral movement of the driving with reference to the driven member in any direction, each compartment being contracted on one side and expanded on the other more or less, according to the extent of the movement, the contractions becoming closures when the driving member is moved far enough to bring the walls of the chamber into contact with the walls of the collar 27. These parts are shown in the last described position in Figs. 1 and 2, and it will be observed that the contraction of the compartments is on opposite sides of the axes of the shaft 26, which hereinafter will be referred to as the axis of rotation.

The length of the collar 27 is less than the depth of the chamber 33, which difference is made up by a flat ring 35, that fills the bottom of the chamber, and has a running fit therein. The rim of the collar 27 bears on this ring and forms a liquid retaining joint similar to that between the driving member and base plate 25. Secured to the ring 35 and extending to the base plate 25 is a rectangular bar or boss 36, this boss being preferably integral with the ring, (see Figs. 4 and 6). At one point the collar 27 is cut away to form a slot 37, to accommodate a bifurcated plug 39. The slot 37 is circular in form and extends to the plate 25 where it coincides with a hole 38, bored through the plate. In this slot and hole is inserted the plug 39 which is provided with a slot 40 adapted to receive the bar 36. By referring to Figure 2, it will be seen that the bar 36 acts as a piston in the two annular compartments into which the chamber 33 is divided. As a matter of fact, there are two pistons, one in each compartment. But for convenience and to simplify the construction, also to make the functioning of the pistons more positive, the two pistons are combined in the one member or bar 36. Hereinafter, therefore, this bar will be referred to as the piston, or pistons. With the parts in the position they occupy in Figure 2, if the collar 27 were rotated on its own axis there would be a resulting compound movement of the piston with reference to the collar. That is, there would be a combined transverse and rocking movement of the piston with reference to the collar. More will be said on this subject presently, but the last statement is made at this time for the purpose of drawing attention to the function of the plug 39.

The driving and driven members are inclosed in a casing which will be designated by the numeral 45. This casing is composed of a cylindrical ring 46, a bottom plate 47, and top 48, the latter being provided with a hub 49, which serves as a journal for the shaft 26. The bottom is provided with a transverse groove 50 adapted to receive splines 51, which are formed on the outside of the bottom 31, of the driving member. The remainder of the outside of the bottom 31 is flat and cooperates with the surface of the member 47, to hold the rim and boss of the driving member in contact with the plate 25. The casing 45 constitutes what may be called a superficial driving member. That is, it serves as an intermediate element which connects the prime mover, not shown, to the driving member. The prime mover may be connected to the member 45 in any suitable manner and the shaft 26 be connected to the mechanism which is to be driven by the clutch. The shaft 26 and member 45 rotate on the same axis, which is the common axis or axis of rotation. When the shaft 26 and the remainder of the driven member is not rotating, that is, when the clutch is disengaged, the casing 45 rotates on the driven member in the manner of a wheel rotating on a fixed axle.

The shaft 26 is bored to receive a spindle 60, this spindle being arranged for longitudinal as well as rotary movement in the shaft. It is moved longitudinally by means of a collar 61 surrounding the shaft and provided with a stud 62, which passes through a longitudinal slot 63 in the shaft 26, and enters an annular groove 64 cut in the spindle 60. By shifting the collar longitudinally on the shaft the spindle may be moved longitudinally within the shaft. The collar will rotate with the shaft 26, of course, and it will be necessary to provide suitable shifting mechanism such as is commonly used for such purposes. In its inner end the spindle carries a member 65, which I will call a shifting head. This head lies in a hole 66, that is formed in the boss 32 at an angle with reference to the axis of rotation. By reason of the angularity of the hole 66, longitudinal movement of the spindle 60 moves the boss 32, and hence the driving member of which the boss is a part, laterally with reference to the collar 27 of the driven member. The parts are so proportioned that the driving member may be moved from a position where its axis of symmetry coincides with the axis of rotation, to a point where its transverse movement is stopped by its wall 30 and boss 32 coming into contact with the outside and inside, respectively, of the collar 27. In practice, especially where the clutch is being used on automobiles, the collar 61 will usually be pressed away from the hub 49 by a spring 67, this causing the parts to assume the position which they occupy in Figs. 1 and 2.

At suitable points the wall 30 of the driving member is provided with ports 70, which are fitted with ball check valves 71, adapted to allow liquid to flow from the casing 45 to the chamber 33, but preventing liquid from flowing out of chamber 33 into the casing. These ports are preferably arranged a few degrees each way from the center of the splines 51, say about ten degrees each way, and on the side of the wall 30 which contacts with the collar 27. This brings one or more ports on each side of the point of contact. The boss 32 is provided with similar ports and check valves which allow liquid to flow from the hole 66 into the chamber 33, but prevent liquid from flowing out of the chamber into the hole. These ports are arranged on each side of the point on the boss which contacts with the interior wall of the collar 27. The groove 50 being deeper than the height of the splines 51, liquid may flow to and fro from the hole 66 to the main portion of the casing 45.

The entire interior of the clutch, that is, the casing, annular compartments, groove and hole 66, are filled with some kind of liquid. For this purpose oil is preferable.

The operation of the clutch will now be explained: The casing 45 rotates on the common axis, and since the driving member is coupled to the casing by the groove 50 and splines 51, it follows that the driving member also rotates about the common axis, what ever its position may be with respect to the casing and driven member. That is, with the parts in the position shown in Figs. 1 and 2, the wall 30 and hub 32 rotate about the axis of the shaft 26 and casing 45. This being the case, the point of contact between the wall 30 and collar 27 rotates around the common axis at just the same velocity as that of the casing. The point of contact between the hub 32 and collar also rotates with the casing. Since these points of contact close the compartments so that no liquid can pass, the liquid in front of these closures is carried around the axis of rotation along with the casing and driving member. The compartments being filled with liquid, a very slight movement of the closures around the axis is sufficient to put the liquid between the closures and the pistons under pressure, and this pressure forces the pistons to rotate carrying the driven member along with the casing and driving member.

Figures 1, 2, 12:
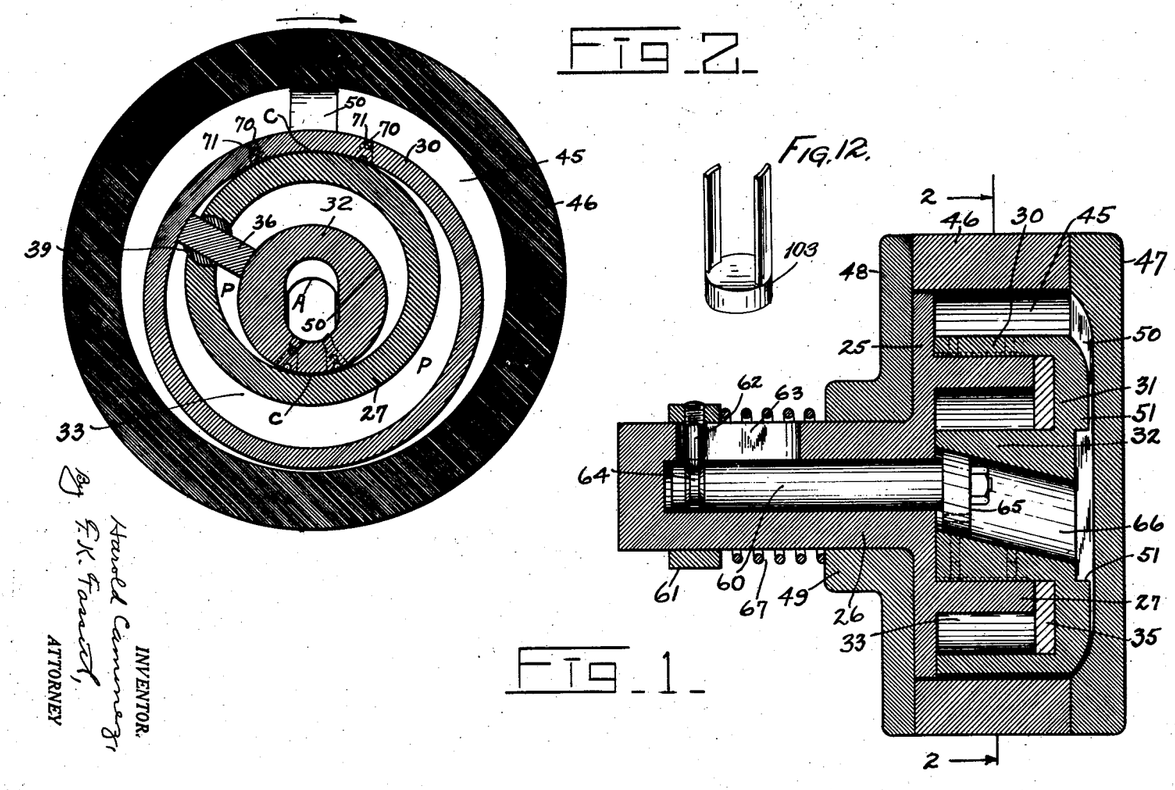
Figure 1 is a longitudinal sectional view of one embodiment of my invention, showing the clutch engaged.
Figure 2 is a transverse sectional view taken on line 2—2 of Figure 1.
Figure 12 is a view of the bifurcated plug forming part of the driving and driven connections of the mechanism of Figures 7 to 11.
Figures 3, 4, 5, 6, 10:
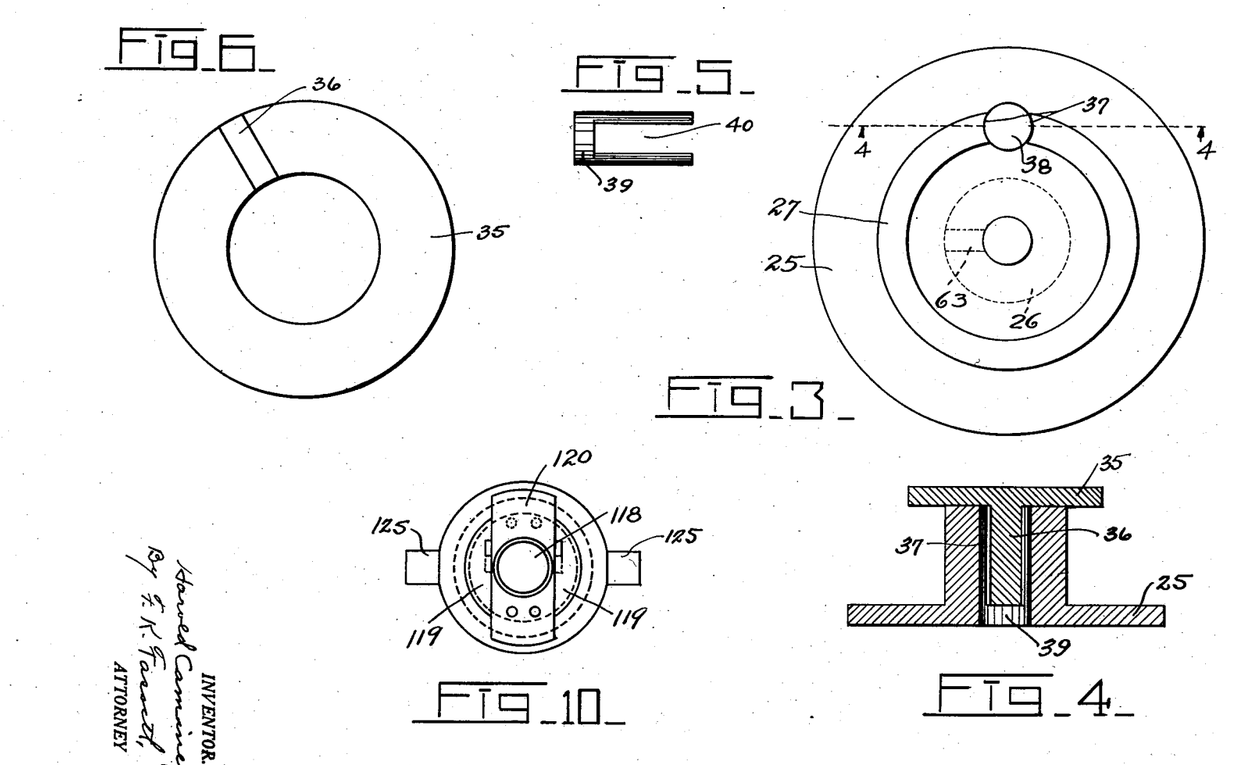
Figure 3 is an end view of the driven member.
Figure 4 is a fragmental sectional view of the driven member taken on line 4—4 of Figure 3. This figure includes a portion of the piston, which does not appear in Figure 3.
Figure 5 is a view of the rocking member by which the piston is given a driving connection with the driven member seen in Figure 4.
Figure 6 is a view of the annular ring shown in Figure 1, and carries the piston 36.
Figure 10 is an end elevational view of the driving member of the clutch shown in Figures 7, 8 and 9.

It will be readily seen from the foregoing that when the casing 45 is rotated about axis A in the direction of the arrow of Fig. 2, with the clutch engaged as shown, the points of contact C will move in the same direction about axis A until the pressure thereby generated in the chamber portions P overcomes the inertia of the driven means by acting directly on the piston 36. The piston 36 will drive the shaft 26 through collar 27 in the same direction as the driving means and at the same or less velocity depending upon whether the contact is fluid tight or not.

While it is intended that there shall be no leakage of liquid past the various joints of the clutch, in practice this may not be wholly realized. That is, it is possible that some liquid may leak past the pistons. Some may also leak past other joints, such as the places where the driving member bears on the base 25, and the collar 27 bears against the ring 35. Such leakage as this will allow a slight slip in the clutch, but with reasonably good workmanship this slip will be negligible. The effect of leakage is also minimized by surrounding the clutching parts with the casing 45 filled with liquid. Any liquid which escapes from the compartments goes into the casing, and from the casing it flows back into the portions of the compartments behind the pistons, where there is no pressure. This is where the ports 70 and check valves 71 function. The valves close under pressure of the liquid and prevent the escape of liquid from the compartments to the casing, but open to allow the liquid to flow into the compartments.

Instead of moving the driving member to the extreme position shown in Figs. 1 and 2, it may be moved but part way, so that instead of being closed at C C the compartments are merely contracted at these points. These contractions will travel around the axis and there will be a reduction of capacity in the portions of the compartments in front of the points C C, similar to that which occurs when the compartments are closed, with a consequent development of pressure behind the pistons, but with this difference: Some of the liquid will flow through the contraction, and while the pistons will be moved by the liquid behind them, and the shaft 26 rotated, the movement will be slower than that of the casing and driving member. This is possible because the ring 35 to which the piston member 36 is attached, may move with reference to the driving member. If the contraction of the compartments is considerable, so that the quantity of liquid that escapes through them is small, the velocity of the driven member will be more nearly equal to that of the driving member than if the contractions are of less degree. By moving the collar 61 to various positions almost any velocity ratio may be obtained. When the clutch is slipping in this manner the position of the piston changes with reference to the collar 27; it slides to and fro through the plug 39, at the same time rocking, with reference to the collar, in the cylindrical plug 39.

To disengage the clutch the collar 61 is pushed toward the hub to bring the axis of symmetry of the chamber 33 into coincidence with the axis of rotation. The compartments will then be symmetrical and the only tendency to rotate the driven member will be friction of the driving member on the pistons and on the liquid. This is negligible, however.

This type of clutch has only one fault that I am aware of and that is only a fault in certain conditions. If it is to be run at high speeds the fact that shifting the driving member laterally throws the clutch out of balance may be objectionable. This difficulty may be overcome by balancing mechanism which I have devised. But as I have also devised a form of clutch that does not have the fault mentioned, it is not necessary to complicate the present application with the balancing mechanism mentioned, particularly since it would not be needed if the clutch operated at moderate speeds.

Before proceeding to a description of the preferred form of the clutch, I wish to mention a use to which the one already described may be put. That is as a brake. The casing 45 may be attached to a fixed part of a device, say of the rear axle of an automobile, and the part 30—31—32 used as a brake to stop the so called driven member.

Figures 7, 8, 9, 11:
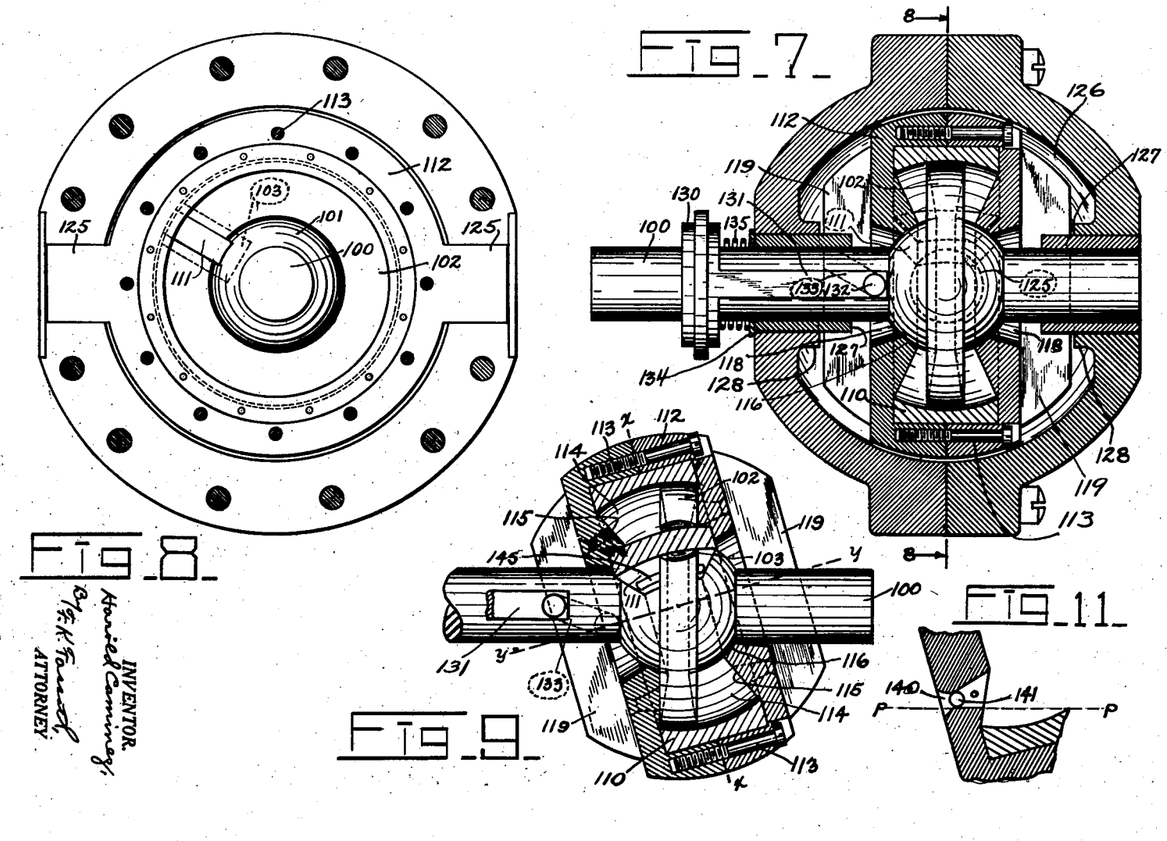
Figure 7 is a longitudinal sectional view of the preferred embodiment of my invention, showing the clutch disengaged.
Figure 8 is a transverse view of the same clutch seen on line 8—8 of Figure 7 with the left hand half of the driving element and the operating element removed.
Figure 9 is a view of the main parts of the clutch shown in Figure 7, showing the parts in the position they occupy when the clutch is engaged.
Figure 11 is a view of a fragment of the driving member.

Referring now to Figs. 7, 8 and 9, the driven member comprises a shaft 100, having a spherical hub 101 on which is formed an annular flange 102, in a plane normal to the axis of rotation of the shaft and coincident with the center of the sphere. The perimeter of the flange is spherical in form and its sides are concave, so that a radial line drawn anywhere on either side will be normal to the surface of the sphere. At one point the flange is notched to receive a cylindrical bifurcated plug 103, similar to the plug 39, previously described, the inner end of the plug extending down into the sphere as is shown with dotted lines in Fig. 8. Surrounding the flange 102 is an annular ring or band 110, the inner wall of which is spherical in form and adapted to fit closely though freely on the spherical perimeter of the flange. The outside of the ring is cylindrical and its edges are flat and parallel to each other. Integral with the ring, preferably, and extending inward toward its axis, is a radial member 111, which I will hereinafter refer to as the piston or pistons. When the ring is in place on the flange this member lies in the bifurcated plug 103 in a manner similar to that of the piston 36 in the plug 39, the purpose of this construction being the same as has already been described.

Surrounding the flange 102 and ring 110, is the driving member 112, which is preferably constructed in two halves united by screws 113. This member is made hollow so as to form a chamber 114. It also has an annular recess to receive the ring 110 with a running fit. The side walls 115 of the chamber are frusto-conical in form and terminate in lips 116 which bear against the spherical hub 101, the surfaces of the lips being made to conform to the sphere. The side edges of the piston 111 are made concave to conform to the conical surfaces 115, while the end of the piston is concave to conform to the spherical hub 101. The driving member is provided with axial apertures 118 through which the shaft 100 passes, these apertures being of sufficient size to allow the driving member to rock on the flange in any direction until the conical walls of the chamber contact on the concave walls of the flange 102. By referring to Fig. 7 it will be seen that the flange 102 divides the chamber 114 into two annular compartments, which in said figure are symmetrical. That is, the cross-sectional area of either compartment is the same at all points around the axis of the shaft, which is also the axis of rotation. In Figure 9, the driving member has been rocked on an axis perpendicular to the axis of rotation, to a point where the conical wall of each compartment contacts with the wall of the flange. This results in expanding diagonally opposite compartments on opposite sides of the axis of rotation and contracting the one adjacent to each on the same side. As the conical walls of the chamber contact with the flange across their entire width, the contraction of each compartment becomes a closure at this point, or rather line, of contact.

Although the driving member may be in running balance when it rotates with its axis of symmetry in coincidence with the axis of rotation of the shaft 100, as in Fig. 7, it will be seen that with the driving member rocked to the position it occupies in Fig. 9, so that its axis of symmetry no longer coincides with its axis of rotation, the running balance may be destroyed, although the static balance of the parts is still maintained. In order to maintain the running balance in all positions of the driving member I provide it with counter weights 119 whereby the moment of inertia of the mass about the major axis $y-y$ is made equal to the moment of inertia of the mass about the major axis $x-x$. In order to accommodate the shaft 100, and for another reason that will be mentioned presently, these weights, which are frustospherical, are divided by a broad slot 120, see Fig. 10. It is not to be understood, however, that I am limited to this particular form of counter weight.

In Fig. 7, the dotted circle 125 represents one of two trunnions formed on opposite sides of the driving member, which are arranged to rock in bearings formed in a casing 126. This casing corresponds to the superficial driving member or casing 45, previously described. Figure 8 shows one half of the driving member and of the casing, and the trunnioned mounting of the driving member in the casing is clearly illustrated. The casing is provided with bearings in which the shaft 100 rotates. At one end the shaft terminates at the outside of the casing, but at its other end the shaft extends beyond the casing, so that it may be attached to whatever mechanism the clutch is required to drive. The bearing at this extended end of the shaft consists of a bushing 127 inserted in the casing 126, the casing being provided with a hub 128 to form a suitable support for the bushing.

For the purpose of controlling the position of the driving member in the casing I provide a shifting mechanism which will now be described:

Loosely mounted on the shaft 100 is a collar 130 provided with two longitudinally extending legs 131, each of which legs carries an outwardly extending stud 132. The legs 131 lie in grooves formed in the hub 128 and the portion of the casing from which the hub extends, so that when the bushing 127 is inserted, the legs are confined in rectangular apertures through which they are adapted to slide. The studs 132 lie in oblique slots 133, that are formed in the interior walls of one of the counter-weights 119. That is, the walls that are formed in the weight 119 by cutting the slot 120 have these oblique slots 133 cut in them. By sliding the collar 130 along the shaft the driving member may be rocked to and fro from the position it occupies in Fig. 7 to that occupied in Fig. 9, the walls of the slots 133 serving as cams with which the studs 132 cooperate for this purpose. A washer 134 surrounds the shaft 100 and is large enough to extend beyond the bushing 127 and bear on the casing 126. A compression spring 135 is confined between this washer and the collar 130, which tends to press the collar away from the casing and hold the driving member in the position it occupies in Fig. 9.

The operation of this clutch is substantially the same as that of the clutch shown in Figs. 1 and 2. With the parts in the position they occupy in Fig. 7, the driving member 112 may rotate freely around the ring 110, leaving the ring and piston 111 stationary, the shaft 100 and flange 102 also remaining stationary. This comes about from the fact that the annular compartments into which the chamber 114 is divided are symmetrical. When the collar 130 is moved outward on the shaft by the spring 135 so as to bring the driving member to the position it occupies in Fig. 9, the annular compartments are distorted in the extreme, each being closed on one side by the wall 115 pressing in contact with the wall of the flange 102. Suppose with the parts in the position they occupy in Fig. 9, the driving member be rotated on the axis of the shaft 100. Evidently, the point of contact between each conical wall 115 and the flange will move around the axis of the shaft. This will result in the capacity of that portion of each compartment between the said point of contact, or closure, and the piston becoming reduced. As the liquid in the compartment is confined, this reduction in the capacity of the space puts the liquid under pressure, which pressure acting on the pistons compels them to move. The pistons are connected to the flange and therefore the shaft 100 is compelled to move with the driving member. Rocking the driving member to a degree less than that shown in Fig. 9, produces a contraction instead of a closure at one side of each compartment, which allows the liquid to flow around the compartment but in a restricted amount. Thus the shaft 100 is driven by the clutch but at a velocity less than that of the driving member. The velocity ratio may be varied at will by operation of the collar 130. Because of the spherical form of the several parts, the driving member is enabled to rotate and rock on the driven member in the manner of a ball and socket joint. Connecting the piston 111 to the flange 102 by means of the bifurcated plug 103 enables the driving member to function in the manner of the socket member of a ball and socket joint, while maintaining its connection with the flange 102.

The driving member is provided with ports 140, which are equipped with ball check valves 141, adapted to prevent liquid flowing from the compartments into the casing 126, but allowing it to flow from the casing to the compartments. One of these ports is placed a short distance at each side of the points on the conical walls 115 which come in contact with the flange 102. The function of these ports is the same as that of ports 70 in the clutch shown in Figs. 1 and 2. That is, as liquid leaks out of the compartments, in case there is leakage, liquid from the casing flows from the casing to the portion of the compartments that is being increased in capacity through slipping of the clutch, with the result that whenever the clutch is thrown into action the compartments are quite full of liquid and the clutch is enabled to transmit torque to the shaft 100, immediately upon engagement of the clutch. The construction of the ports 140 is illustrated in Figure 11, and it will be noticed that the port is arranged on a line p—p, which when the clutch is engaged, as in Figure 9, is parallel to the axis of the shaft 100. The purpose of this arrangement is to eliminate as far as possible the effect of centrifugal force on the ball valves 141 when the clutch is engaged.

For the purpose of equalizing the pressure in the compartments a groove 145 may be formed in each side of the piston, as in Figure 9. This, however, is not essential. A similar groove may be provided in the piston 36, in Figures 1 and 2. The advantage of confining the clutch in a casing filled with liquid has been explained, but this feature is not to be understood as essential. Instead of the closed casings 45 and 126, the superficial driving member may comprise any suitable frame or support which will perform the functions assigned to the casings, other than that of containing liquid. It is not to be understood that my invention is limited to embodiments shown, with the modifications mentioned, as other modifications may be made without departing from the spirit or exceeding the scope of my invention as defined by the appended claims.

What I claim is as follows:

1. In a hydraulic clutch, a single driving member, a single driven member, one of said members enclosing the other thereof so as to form two symmetrical chambers, means for moving one member relative to the other for varying the symmetry of said chambers, and a single wall slidably engaged in the inner member and slidable on the walls of the outer member for further dividing each of said chambers into geometrically similar chambers.

2. A hydraulic clutch comprising, a member provided with a chamber, a member enclosed therein, said members arranged to rotate about a common axis and provided with contacting surfaces to form annular compartments in said chamber, a liquid in said chamber, means for oscillating one of said members on an axis perpendicular to said common axis to and fro between a position where the axis of symmetry of the chamber coincides with the axis of rotation and a position where said axis of symmetry lies at various angles to said axis of rotation and where the compartments are unsymmetric, and a piston in the compartment attached to one of the members whereby one member drives the other through the medium of the liquid at a ratio variable according to the degree to which the flow of the liquid is restricted.

3. In a hydraulic clutch, a single member provided with a chamber, a single member enclosed thereby, said members being arranged to rotate about a common axis and provided with constantly contacting surfaces dividing said chamber into two annular compartments, a liquid in said compartments, means for producing relative movement between the chambered and enclosed members to and fro between a position where the axis of symmetry of the chamber coincides with said axis of rotation and the circulation of liquid around the axis is unrestricted and positions where said axis of symmetry does not coincide with the axis of rotation and the circulation of liquid is restricted, said compartments disposed relatively to each other so that upon such movement contractions take place on opposite sides of the axis of rotation, and a piston in each compartment attached to one of said members whereby either member may drive the other through the medium of the liquid at a ratio according to the degree of fluid restriction.

4. A hydraulic clutch embodying the characteristics described in claim 3, in which the compartments are reciprocally unsymmetrical wherein a contraction of given magnitude in either compartment is always equal in degree to the expansion in the other compartment in the same radial plane, and in which the two pistons comprise a single member that passes through the enclosed member slidingly and are enabled to accommodate to the reciprocally varying compartments.

5. A hydraulic clutch embodying characteristics described in claim 3 in which the chambered member is enclosed in a fluid tight casing arranged to rotate on said common axis, said casing and chambered member being connected for driving one another effectively whatever be the position of the chambered member therein, ports in the chambered member through which liquid may pass from said casing to said chamber, and check valves in said ports to prevent passage of the liquid from the chamber to the casing.

6. A hydraulic clutch embodying the characteristics described in claim 3, in which the two pistons comprise a single member that passes through the enclosed member with a sliding fit that enables the pistons to accommodate themselves to the varying proportions of the compartments, the connection of said piston member to the enclosed member being through a cylindrical plug which enables the piston to rock in the member it passes through.

7. A hydraulic clutch embodying the characteristics described in claim 3, wherein the pistons constitute a single piece which is attached to a member mounted to rotate in the chamber always on the axis of symmetry of the chamber, said single piece passing through the enclosed member so as to serve as a piston in each compartment, and having a combined sliding and rocking engagement with said enclosed member.

8. A hydraulic clutch comprising, a member provided with a chamber, a member enclosed thereby, said members being arranged to rotate about a common axis and having constantly contacting surfaces to divide said chamber into two annular compartments, a liquid in said compartments, means for oscillating the chambered member on an axis perpendicular to said axis of rotation to and fro between a position where the axis of symmetry of the chamber coincides with said axis of rotation, where said compartments are symmetrical and a liquid flow is unrestricted, to a position where said axis of symmetry lies at an angle with respect to said axis of rotation and the compartments are unsymmetrical, and a piston attached to one of said members whereby one said member can drive the other said member through the medium of the liquid at a ratio variable in proportion to the degree of unsymmetricalness of said compartments.

9. In a hydraulic clutch, a driven member comprising a shaft carrying a spherical hub, an annular flange centrally located on said hub normal to the axis of rotation of the shaft, a hollow driving member enclosing said driven member and having lips which bear against the sphere, thereby producing a closed chamber adapted to retain a fluid, said flange extending to the peripheral wall of said chamber, thereby dividing said chamber into two annular compartments, said hub and chamber permitting said driving and driven members to sustain relative movement, said annular compartments being symmetrical when the axis of symmetry of the chamber coincides with said axis of rotation, means for making said compartments unsymmetrical to thereby restrict fluid flow about said axis of rotation by rocking of the driving member with respect to the driven member, the sides of said flange and of the opposing walls of said chamber so formed as to contact across their entire radial width, and a piston in each compartment attached to the driven member whereby said member is driven by the driving member through the medium of said fluid.

10. A hydraulic clutch embodying the characteristics described in claim 9 and wherein said driving member is pivotally attached to a superficial driving member which is mounted to rotate on said axis of rotation, the axis of said attachment intersecting said axis of rotation perpendicularly.

11. A hydraulic clutch embodying the characteristics described in claim 9 and wherein said driving member is counterweighted so that it will be in dynamic balance when rotating with its axis of symmetry out of coincidence with the axis of rotation, in any position it may occupy with respect to the driven member.

12. A hydraulic clutch embodying the characteristics described in claim 9, and in which the driving member is counterweighted so that the moments of inertia about both of its major axes are equal.

13. A hydraulic clutch as described in claim 9, in which the described structure is enclosed in an outer fluid tight case constituting a superficial driving member, said casing having journals for the driven shaft and journals perpendicular thereto but in the same plane to receive trunnions projecting from the driving member, ports connecting from said annular compartments with the interior of said superficial driving member, and check valves in said ports to permit liquid to flow from said superficial casing to said compartments and preventing flow in the opposite direction.

14. A hydraulic clutch embodying the characteristics described in claim 9, in combination with means for rotating the driving member on an axis which coincides with the axis of rotation of the driven member, and means for rocking the driving member on an axis that intersects said axis of rotation perpendicularly.

15. A hydraulic clutch embodying the characteristics described in claim 3, in which the pressure in the annular compartments is equalized by ports connecting the compartments.

16. A hydraulic clutch embodying the characteristics described in claim 9, in which the described structure is enclosed in an outer casing which constitutes a superficial driving member, said casing having journals for the driven shaft and journals perpendicular thereto, but in the same plane, to receive trunnions projecting from the driving member, said casing being filled with liquid; ports connecting the annular compartments with the interior of said casing, and check valves in said ports to prevent liquid flowing from the compartments to the casing; but allowing it to flow from the casing to the compartments, said ports being arranged at an angle such that the movement of the check valves to and from their seats is on a line parallel to the axis of rotation when the clutch is engaged.

HAROLD CAMINEZ.